United States Patent
Molter et al.

(10) Patent No.: US 11,353,222 B2
(45) Date of Patent: Jun. 7, 2022

(54) AIR-WATER EXTRACTION SYSTEM

(71) Applicant: SKYRE, INC., East Hartford, CT (US)

(72) Inventors: Trent M. Molter, Glastonbury, CT (US); Joshua S. Preston, Manchester, CT (US)

(73) Assignee: SKYRE, INC., East Hartford, CT (US)

( * ) Notice: Subject to any disclaimer, the term of this patent is extended or adjusted under 35 U.S.C. 154(b) by 248 days.

(21) Appl. No.: 16/648,699

(22) PCT Filed: Sep. 24, 2018

(86) PCT No.: PCT/US2018/052341
§ 371 (c)(1),
(2) Date: Mar. 19, 2020

(87) PCT Pub. No.: WO2019/060800
PCT Pub. Date: Mar. 28, 2019

(65) Prior Publication Data
US 2020/0284448 A1    Sep. 10, 2020

Related U.S. Application Data

(60) Provisional application No. 62/561,987, filed on Sep. 22, 2017.

(51) Int. Cl.
*F24F 3/14* (2006.01)

(52) U.S. Cl.
CPC .......... *F24F 3/1417* (2013.01); *F24F 3/1423* (2013.01); *B01D 2257/80* (2013.01);
(Continued)

(58) Field of Classification Search
CPC .......... F24F 3/1417; F24F 3/1423; F24F 3/14; F24F 2003/1435; F24F 2003/144;
(Continued)

(56) References Cited

U.S. PATENT DOCUMENTS

| 7,951,494 B2 | 5/2011 | Sawa et al. |
| 2004/0115489 A1* | 6/2004 | Goel ................ H01M 8/04126 429/413 |

(Continued)

FOREIGN PATENT DOCUMENTS

| CN | 101306302 A | 11/2008 |
| CN | 104083994 A | 10/2014 |

(Continued)

OTHER PUBLICATIONS

International Search Report; International Application No. PCT/US2018/05341; International Filing Date: Sep. 24, 2018; dated Jan. 18, 2019; 16 pages.

(Continued)

*Primary Examiner* — Elizabeth J Martin
(74) *Attorney, Agent, or Firm* — Cantor Colburn LLP

(57) ABSTRACT

Disclosed herein is an air-water extraction system that includes a water selective membrane configured to transport water from humid air via selective diffusion through the water selective membrane; a low pressure chamber in fluid communication with the water selective membrane and a hydrogen gas inlet configured to deliver a dry hydrogen to the low pressure gas chamber, a membrane and electrode assembly comprising an anode, a proton exchange membrane, a cathode, and a power supply; wherein the anode is in fluid communication with the low pressure chamber, a high pressure chamber in fluid communication with the cathode for receiving a saturated hydrogen and a liquid water from the cathode; a water conduit in fluid communication with the high pressure chamber configured to remove the liquid water from the high pressure chamber, and a hydrogen conduit for removing the saturated hydrogen from the high pressure chamber.

20 Claims, 2 Drawing Sheets

(52) U.S. Cl.
CPC .. *B01D 2259/812* (2013.01); *F24F 2003/144* (2013.01); *F24F 2003/1435* (2013.01)

(58) Field of Classification Search
CPC .......... B01D 2257/80; B01D 2259/812; B01D 53/32; F25B 17/00; F25B 24/14; F25B 21/14
See application file for complete search history.

(56) References Cited

U.S. PATENT DOCUMENTS

| | | |
|---|---|---|
| 2006/0115696 A1 | 6/2006 | Kanai et al. |
| 2012/0118147 A1 | 5/2012 | Claridge et al. |
| 2014/0367073 A1 | 12/2014 | Heldal et al. |
| 2015/0096884 A1 | 4/2015 | Shealy et al. |
| 2018/0180307 A1 | 6/2018 | Owejan et al. |
| 2018/0187906 A1 | 7/2018 | Bahar et al. |
| 2021/0138396 A1 | 5/2021 | Qi et al. |

FOREIGN PATENT DOCUMENTS

| | | |
|---|---|---|
| CN | 105727703 A | 7/2016 |
| DE | 19621752 A1 | 1/1997 |
| JP | 2003090567 A | 3/1928 |
| JP | 19837034972 | 6/1989 |
| JP | H11137946 A | 5/1999 |
| JP | H11151416 A | 6/1999 |
| JP | 2001248864 | 9/2001 |
| WO | 2017091785 A1 | 6/2017 |

OTHER PUBLICATIONS

Motupally et al., "Diffusion of Water in Nation 115 Membranes," Journal of The Electrochemical Society, 2000, pp. 3171-3177, vol. 147 (9).

Onda et al, "Polymer Electrolyte Dehumidifying Cell and Its Application to Air Conditioners," Journal of The Electrochemical Societ, Jan. 2005, vol. 152(12).

Qi et al. "Performance investigation on polymeric electrolyte ..." vol. 208, pp. 1174-1183.

Written Opinion; International Application No. PCT/US2018/05341; International Filing Date: Sep. 24, 2018; dated Jan. 18, 2019; 16 pages.

* cited by examiner

AIR-WATER EXTRACTION SYSTEM

CROSS REFERENCE TO RELATED APPLICATIONS

This application is a National Stage application of PCT/US2018/052341, filed Sep. 24, 2018, which claims the benefit of U.S. Provisional Application No. 62/561,987 filed Sep. 22, 2017, both of which are incorporated by reference in their entirety herein.

BACKGROUND

Over the last few decades, the demands for humidity controlled buildings has continually increased, with demands ranging from use in public and private spaces to use in manufacturing spaces, for example, that manufacture electronic devices. Conventional air conditioning systems often have limitations in achieving a desired amount of dehumidification in addition to an overuse in CFCs. Independent humidity control devices have been used to try and mitigate these issues including utilizing liquid or solid desiccants. Desiccant solutions though have practical limitations in both commercial and industrial applications, including complex system designs, often occupying a large volumetric space, as well as issues with desiccant carry-over resulting in metal corrosion and potential health concerns.

More recently, dehumidifying cells that rely on electro-chemical dehumidification have been developed. One such electrochemical dehumidification system was presented by Qi et al. Applied Energy 208 (2017) 1174-1183 that introduces humid air to an anode where the water is split into protons, electrons, and oxygen. The protons are then transported through a proton exchange membrane along with excess water to the cathode, where they are reacted with oxygen and electrons to reform the water. The transported water and the formed water are then removed as liquid water from the system, resulting in the dehumidification of the humid air. This system though has several drawbacks including a high operation voltage. Such a high operating voltage can limit the amount of water removed from the humid air and can disadvantageously result in membrane degradation over time due to the formation of free radicals in the membrane.

An improved electrochemical dehumidification system that overcomes these or other drawbacks is therefore desired.

BRIEF SUMMARY

Disclosed herein is an air-water extraction system and a method of extracting water from humid air.

In an embodiment, an air-water extraction system comprises a water selective membrane configured to transport water from humid air via selective diffusion through the water selective membrane from a first side to a second side; a low pressure chamber in fluid communication with the second side of the water selective membrane and a hydrogen gas inlet configured to deliver a dry hydrogen to the low pressure gas chamber; a membrane and electrode assembly comprising an anode, a proton exchange membrane, a cathode, and a power supply; wherein the anode is in fluid communication with the low pressure chamber; a high pressure chamber in fluid communication with the cathode for receiving a saturated hydrogen and a liquid water from the cathode; a water conduit in fluid communication with the high pressure chamber configured to remove the liquid water from the high pressure chamber; and a hydrogen conduit for removing the saturated hydrogen from the high pressure chamber.

In another embodiment, a method of removing water from humid air comprises transporting water from a humid air through a water selective membrane to a low pressure chamber and directing a dry hydrogen to the low pressure chamber via a hydrogen gas inlet to form a mixed gas, wherein the low pressure chamber is in fluid communication with a membrane and electrode assembly, wherein the membrane and electrode assembly comprises an anode, a proton exchange membrane, a cathode, and an power supply; applying a voltage to the membrane and electrode assembly to cause the dry hydrogen at the anode to disassociate into protons and electrons and directing the protons and the water from the anode through the proton exchange membrane to the cathode, wherein the protons recombine with the electrons at the cathode to form a combined hydrogen; and collecting the combined hydrogen and the water in in a high pressure chamber.

The above described and other features are exemplified by the following figures, detailed description, and claims.

BRIEF DESCRIPTION OF THE DRAWINGS

The figures are non-limiting exemplary embodiments, wherein the like elements are numbered alike.

DETAILED DESCRIPTION

An air-water extraction system was developed that removes water from humid air in two different transport regions. The first region is a concentration driven transport region I that utilizes a water selective membrane to selectively remove water from the humid air. The second region is an electro-osmotic driven transport region II that actively pumps the water across a proton exchange membrane based on the electro-osmotic drag of water to a high pressure region. More specifically, the air-water extraction system utilizes the water selective membrane to first separate water from humid air. The separated water is combined with hydrogen to form a gas mixture and the gas mixture is introduced to a membrane and electrode assembly. At the anode, the hydrogen is split into protons and electrons and the protons and water are driven across the proton exchange membrane. At the cathode, the protons are reacted with electrons to reform the hydrogen. The water, in liquid form, that was dragged across the membrane can then be removed. An illustrative example of an air-water extraction system is shown in FIG. 1 as is describe below in more detail.

Figure 1:
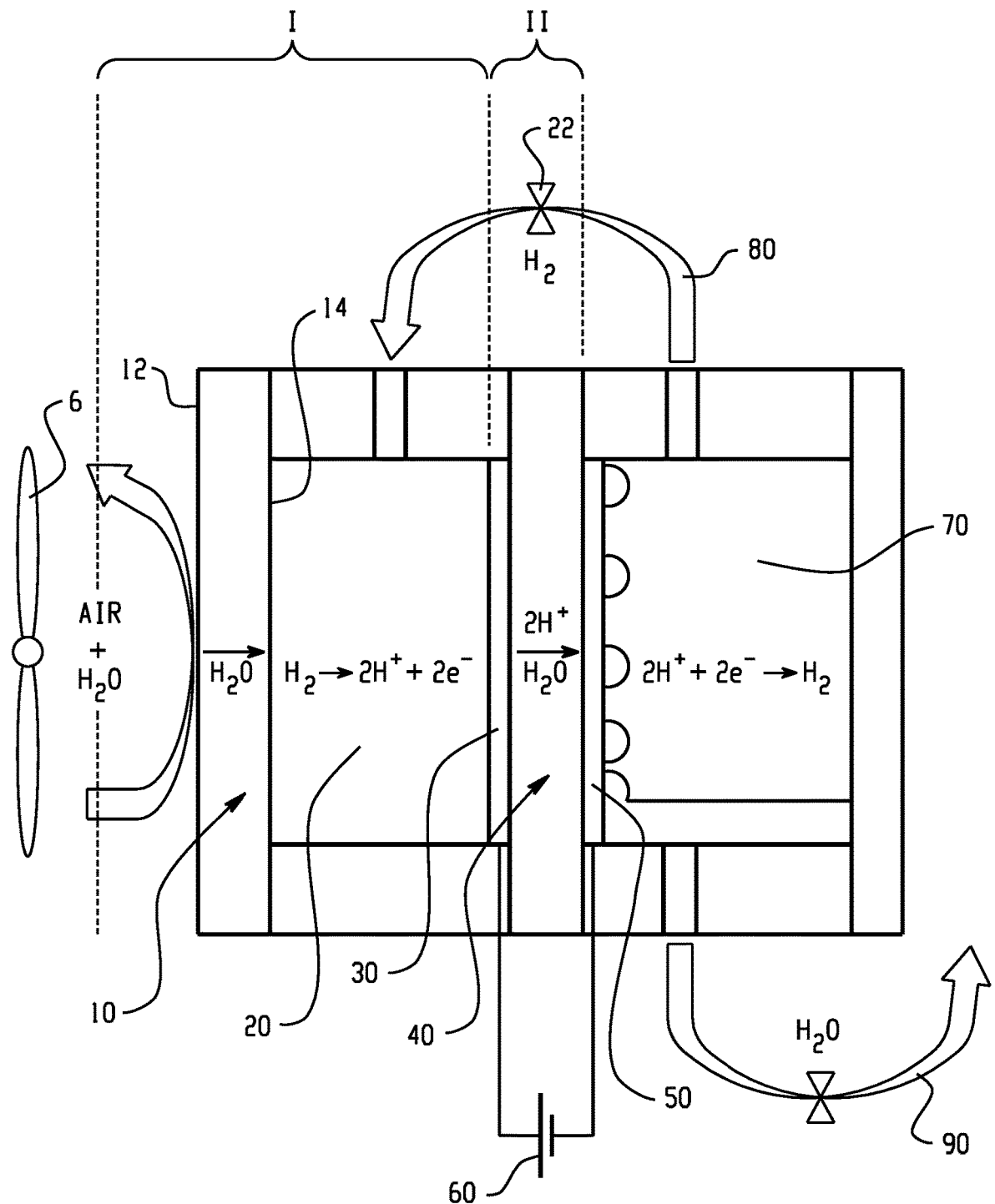
FIG. 1 is an illustrative embodiment of an air-water extraction system.

In region I, humid air can be exposed to a first side of the water selective membrane by natural convection or exposure can be facilitated with an air flow aide such as a fan, for example, fan 6 as illustrated in FIG. 1. The humid air can have an initial relative humidity of 20 to 100%, or 40 to 100%, where it is noted that the lower limit of the initial relative humidity for the air-water extraction system to work can be dependent upon the relative humidity in both the low pressure chamber and the high pressure chamber as well as their relative pressure values.

Water present in the humid air can spontaneously enter the water selective membrane due to the hygroscopic nature of the membrane to be transported through the water selective membrane due to the presence of a concentration gradient. Pendent functional groups of the water selective membrane can form clusters that result in the creation of hydrophilic pores or pathways that allow for the transport of water through the membrane. The water can be driven through the network of pores based on a difference in a water activity profile established across the membrane. As the water selective membrane is selective to water, the water selective membrane can transport water molecules at the exclusion of other molecules, for example, oxygen, carbon dioxide, or nitrogen.

FIG. 1 illustrates that the water selective membrane transports water molecules from the humid air to a low pressure chamber 20. As is described above, the transport of water through the water selective membrane 10 can occur as a result of a concentration gradient where there is a higher concentration of water at the first side 12 of the water selective membrane 10 and a lower concentration of water at the second side 14 of the water selective membrane 10.

The water selective membrane can comprise an ionomer-type polyelectrolyte comprising an amount of ionic groups on a hydrophobic backbone or on pendent groups off of the hydrophobic backbone. The ionomer-type polyelectrolyte can comprise at least one of a sulfonated poly(xylylene oxide) or a sulfonated fluoropolymer (such as a lithium salt of perfluoroethylene sulfonic acid). An example of such a water selective membrane is Nafion that is commercially available from DuPont. The water selective membrane can comprise a water selective asymmetric membrane having two or more layers such as a Loeb-Sourirajan type membrane comprising acetyl cellulose. The water selective membrane can comprise a porous plate treated with a hydrophilic compound, where the porous plate can comprise paper or a porous polymer film treated with at least one of poly(vinyl alcohol), poly(vinyl chloride), poly(ethylene oxide), polyacrylamide, poly(vinyl pyrrolidone), poly(vinyl acetate), or a cellulose derivate.

As is understood by those of skill in the art, many different configurations can be used to introduce water from the water selective membrane and the dry hydrogen into the low pressure chamber. For example, the air-water extraction system can comprise two or more water selective membranes in series. The water selective membrane can be corrugated to increase its surface area relative to the surface area of a flat membrane. The water selective membrane can be in the form of a tube, where the dry hydrogen can be passed through the inner chamber of the tube and the outer surface of the tube can be exposed to the humid air. The water from the humid air can then be transported through the wall of the tube to enter the inner chamber of the tube to form the gas mixture. The inner chamber of the tube can be the low pressure chamber or the low pressure chamber can be in fluid communication with the inner chamber of the tube.

From the second side of the water selective membrane, the water can evaporate off of the water selective membrane into the dry hydrogen to form a gas mixture. The evaporation of the water off of the water selective membrane can maintain the presence of the concentration gradient in the membrane, thusly maintaining the driving force for water to pass through the water selective membrane. FIG. 1 illustrates that the water can enter the low pressure chamber 20 from the second side 14 of the water selective membrane 10. The low pressure chamber can therefore comprise a gas mixture of the transported water and the dry hydrogen. As the water selective membrane can selectively transport water through the membrane, retarding the transport of other molecules, the gas mixture in the low pressure chamber, including the transported water, hydrogen, and any water originating from the dry hydrogen, can account for 90 to 100 volume percent (vol %), or 95 to 100 vol %, or 99.5 to 100 vol % of the total volume of the gas in the low pressure chamber. The gas mixture can comprise less than 5 vol %, or 0 to 1 vol % of oxygen based on the total volume of gas in the gas mixture. The gas mixture in the low pressure chamber can have a relative humidity of 20 to 100%, or 40 to 100%, or 70 to 95%. While an amount of liquid water can be present in the low pressure chamber, 95 to 100 wt %, or 99 to 100 wt % of the water can be present in the gas form based on the total weight of the water in the low pressure chamber.

Dry hydrogen can be added to low pressure chamber via a hydrogen gas inlet. Prior to addition into the low pressure chamber, the dry hydrogen can have a relative humidity of less than or equal to 20%, or 0 to 15%, or 5 to 10%, or 1 to 5%.

The low pressure chamber can be an open chamber, for example, such that only the gas mixture occupies the open chamber. Conversely, the low pressure chamber can comprise at least one of a woven screen or a plate with open channels. The low pressure chamber can comprise an expanded sheet metal that can function as a fluid flow field. The pressure in the low pressure chamber 20 can be atmospheric, sub-atmospheric, or 0.2 kilopascal (kPa) to 50 megapascal (MPa), or 100 kilopascal to 5 MPa, or 0.1 to 1 MPa. It is noted that the upper limit of the pressure in the low pressure chamber 20 can be limited by the pressure thresholds of one or both of the respective membranes, where above the pressure threshold mechanical failure of one of the membranes can occur.

The gas mixture can be exposed to a membrane and electrode assembly (MEA). The MEA can utilize a small voltage to electrochemically compress hydrogen from the low pressure hydrogen at the anode side of the MEA to a high pressure hydrogen at the cathode side of the MEA. The reduction potential of the electrochemical reaction can be characterized by the Nernst equation and can carry an equivalent value to that required for ideal isothermal compression. An additional small voltage can be applied to meet the Ohmic resistance of the proton transport membrane to accelerate the catalytic effects at the electrodes. Hydrogen can be evolved from the cathode of the cell with water, which is transported across the proton transport membrane along with the protons. The process dries out the anode side of the proton transport membrane maintaining the concentration gradient for promoting the concentration driven transport in region I. The transported water emerges from the cathode in liquid form and the high pressure hydrogen gas is saturated with water vapor at the operating pressure and temperature of the high pressure chamber.

FIG. 1 illustrates that the mixed gas in the low pressure chamber 20 is in contact with an MEA. The MEA can comprise a proton exchange membrane 40 with catalytic electrodes, anode 30 and cathode 50, located on either side to facilitate the electrochemical half reactions. The hydrogen from the low pressure chamber that is in contact with the anode can be split into protons and electrons by the electrochemical reaction (1).

$$H_2 \rightarrow 2H^+ + 2e^- \tag{1}$$

The protons formed from the reaction (1) can be driven across the proton exchange membrane due to the polarity of the voltage applied and the electrons formed from reaction (1) can be bussed through an external circuit. Each proton transported through the proton exchange membrane can drag an amount of water along with it, where it is believed that between 2 and 4 moles, or 2.5 to 3.5 moles of water can be transported across the membrane for every mole of protons that passes through the proton exchange membrane.

The protons driven through the proton exchange membrane can then be combined at the cathode side of the MEA with the electrons being bussed from the external circuit by the electrochemical reaction (2).

$$2H^+ + 2e^- \rightarrow H_2 \qquad (2)$$

The electrodes (anode 30 and/or cathode 50) can be in direct physical contact with the proton exchange membrane and can cover 90 to 100% of the respective surface areas of the proton exchange membrane. Each electrode independently comprises a catalyst layer. The catalyst layer can comprise at least one of platinum, palladium, rhodium, carbon, gold, tantalum, tungsten, ruthenium, iridium, osmium, or silver. The catalyst can comprise a bound catalyst. The binder can comprise at least one of a fluoropolymer or a particulate carbon. The catalyst and optional binder can be deposited directly onto the surfaces of the proton exchange membrane. The catalyst can be disposed on a gas diffusion layer such that it is located throughout the gas diffusion layer or on a surface of the gas diffusion layer that is in contact with the proton exchange membrane. The gas diffusion layer can be porous. The gas diffusion layer can be a mesh. The gas diffusion layer can comprise a graphitic material. The gas diffusion layer can comprise a plurality of fibers such as carbon fibers. The gas diffusion layer can be electrically conductive.

The proton exchange membrane can comprise an electrolyte such as at least one of a proton conducting ionomer or an ion exchange resin. The proton conducting ionomer can comprise a polymer complexed with at least one of an alkali metal salt, an alkali earth metal salt, a protonic acid, or a protonic acid salt. The complexed polymer can comprise at least one of a polyether, polyester, polyimide, or a polyoxyalkylene (such as poly(ethylene glycol), poly(ethylene glycol monoether), or poly(ethylene glycol diether)).

The proton exchange membrane can comprise the same or different material as the water selective membrane. For example, the proton exchange membrane can comprise an ionomer-type polyelectrolyte comprising an amount of ionic groups on a hydrophobic backbone or on pendent groups off of the hydrophobic backbone such as a hydrocarbon- and fluorocarbon-type resin. The hydrocarbon-type ion-exchange resin can comprise at least one of a phenolic resin or a polystyrene. The hydrocarbon-type ion-exchange resin can be sulfonated, for example, a sulfonated poly(xylylene oxide). The hydrocarbon-type ion-exchange resin can comprise a proton conducting molecule, for example, at least one of a fullerene molecule, a carbon fiber, or a carbon nanotube. The proton conducting molecules can comprise proton dissociation groups, for example, least one of —$OSO_3H$, —$OPO(OH)_2$, —$COOH$, —$SO_3H$, —$C_6H_4$, —$SO_3H$, or —OH. The proton conducting molecules alone can form the proton exchange membrane or can be present as a mixture with a binder polymer such as at least one of a fluoropolymer (for example, polyfluoroethylene or poly(vinylidene fluoride)) or poly(vinyl alcohol). As oxygen is not present in a significant amount in the proton exchange membrane, the concern for oxidation is low, and the proton exchange membrane can comprise a hydrocarbon-type ion-exchange resin.

The fluorocarbon-type ion-exchange resin can include a hydrate of at least one of tetrafluoroethylene-perfluorosulfonyl ethoxyvinyl ether or tetrafluoroethylene-hydroxylated (perfluoro vinyl ether) copolymer. The fluorocarbon-type ion-exchange resin can have at least one of a sulfonic, a carboxylic, or a phosphoric acid functionality. The fluorocarbon-type ion-exchange resin can be a sulfonated fluoropolymer (such as a lithium salt of perfluoroethylene sulfonic acid). An example of fluorocarbon-type ion-exchange resin is Nafion that is commercially available from DuPont.

The air-water extraction system can be self-regulating in that if the air has been sufficiently dehumidified, then the gas mixture in the low pressure chamber will have a low concentration of water. The reduced amount of water in the low pressure chamber will result in less water being transported across the proton exchange membrane, drying it out to a point where the MEA is inoperable. A control can therefore be set so that if the current reaches a certain value, the system is turned off.

FIG. 1 illustrates that a power source 60 can be used to apply a voltage to the MEA. The applied voltage can be less than or equal to 1 volt (V), or less than or equal to 0.8 volts, less than or equal to 0.5 volts, or 0.01 to 0.2 volts. The power source can be a solar array, a direct current (DC) source, a windmill, a battery (for example, a flow battery), a fuel cell, etc.

FIG. 1 illustrates that at the cathode side of the MEA, condensed water and hydrogen collect in the high pressure chamber 70. The high pressure chamber can be an open chamber, for example, such that only the gas mixture and condensed water occupies the open chamber. Conversely, the high pressure chamber can comprise at least one of a woven screen or a plate with open channels. The high pressure chamber can comprise an expanded sheet metal that can function as a fluid flow field.

The condensed water in liquid form can be recovered from the system via a water conduit, for example, water conduit 90 as illustrated in FIG. 1. The water conduit 90 can include a regulator 92 that can regulate the water to ambient pressure for removal from the system. The reformed hydrogen can be saturated with water vapor at the temperature and pressure of the high pressure chamber. The pressure in the high pressure chamber can be 5 to 100 MPa, or 10 to 50 MPa, or 10 to 20 MPa, where it is noted that the maximum pressure in the high pressure chamber can be limited merely by the mechanical robustness of the high pressure chamber and ability of the MEA to withstand the pressure differential across the membrane.

FIG. 1 illustrates that the hydrogen can be removed from the high pressure chamber 70 via hydrogen conduit 80 and can optionally be recycled by reintroducing it to the low pressure chamber 20. Before entry into the low pressure chamber, the hydrogen can pass through a throttling value 82 to reduce the pressure of the gas. The throttling valve can be modeled as an adiabatic expansion of the hydrogen gas. In practice, the total pressure of the gas can decrease across the throttling valve and the temperature of the hydrogen can increase by an amount due to hydrogen's negative Joule-Thomson Effect. The total pressure of the gas can thereby be reduced by several orders of magnitude, which can also reduce the partial pressure of water by the same ratio to result in a hydrogen gas with a reduced relative humidity. The system therefore has the benefit of not requiring an amount of makeup hydrogen for continuous operation as the hydrogen can be conserved. It is noted that if the water selective membrane allows for an amount of hydrogen permeability through the membrane, than an amount of makeup hydrogen may be needed to make up for any hydrogen lost through the water selective membrane.

Figure 2:
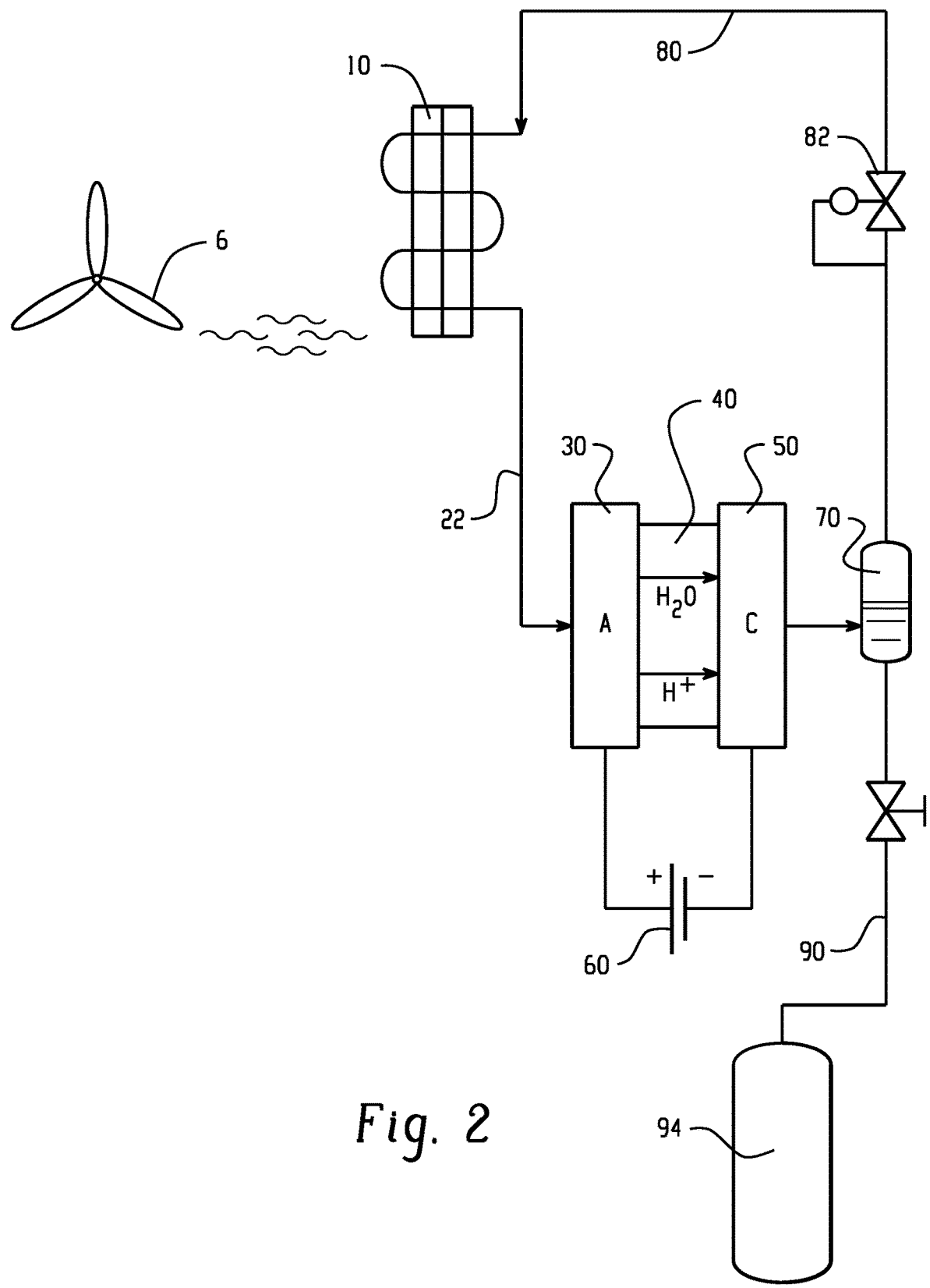
FIG. 2 is an illustrative embodiment of an air-water extraction system.

FIG. 2 is an illustration of a block diagram of the air-water extraction system. FIG. 2 illustrates that humid air can be directed to a water selective membrane 10 via a fan 6. Mixed gas conduit 22 can direct the mixed gas comprising water removed from the humid air and hydrogen to anode 30 of an MEA. The hydrogen can be split into protons and electrons and the protons can be directed through the proton exchange membrane along with the water due to electro-osmotic drag to the cathode 50. At the cathode 50, the hydrogen can be reformed via reaction of the protons driven through the membrane and electrons bussed through an external circuit. The reformed hydrogen and the recovered water can enter high pressure chamber 70. Water can be removed from the high pressure chamber 70 via water conduit 90, where it can pass through regulator 92 before being directed to water storage tank 94. Hydrogen from the high pressure chamber 70 can be removed via hydrogen conduit 80, it can pass through throttling valve 82 to reduce the pressure and the relative humidity of the hydrogen before being reintroduced to the low pressure chamber 20.

The air-water extraction system can be used to dehumidify air. For example, the relative humidity of the humid air can be reduced from an initial humidity of 20 to 100%, or 40 to 100% to a final humidity value of 0 to 80%, or 10 to 50%, or 20 to 35%, or 19 to 80% at the ambient pressure and temperature. In order to increase the dehumidification capabilities of the air-water extraction system, one or more steps can be taken including at least one of using two or more air-water extraction units in series or in parallel, increasing the operating pressure in the high pressure chamber, increasing the surface area of the respective membranes, increasing the current density across the MEA, or increasing the flow rate of the hydrogen.

The recovered water can be pure water and can be used to provide clean drinking water. Water can be recovered at a rate of as much as $5\times10^{-4}$ grams of water per second per centimeter squared of the MEA (g/s/cm$^2$), for example, 0.1 to $4\times10^{-4}$ g/s/cm$^2$, or 1 to $4\times10^{-4}$ g/s/cm$^2$.

The following example is provided to illustrate the present disclosure. The example is merely illustrative and are not intended to limit devices made in accordance with the disclosure to the materials, conditions, or process parameters set forth therein.

EXAMPLES

Example 1

An air-water extraction system was prepared according to the block diagram illustrated in FIG. 2 and the system was run at an ambient temperature of 20° C. Humid air at a relative humidity of 40% was introduced to the water selective membrane 10. The hydrogen in the low pressure chamber had a relative humidity of 75%. The operating voltage of the MEA was 0.49 V at a current density of 0.42 amperes per centimeter squared (A/cm$^2$). The pressure in the high pressure chamber was 165 pounds per square inch absolute (psi) (1.13 MPa). The pressure of the hydrogen after passing through the throttling valve 82 was 16.7 psi (0.11 MPa) and the relative humidity was 10%. Assuming that 2.5 moles of water passes through the proton exchange membrane for every mole of proton and using Faraday's law, the water production rate was calculated as being $1.96\times10^{-4}$ grams of water per second per centimeter squared.

Set forth below are non-limiting aspects of the present disclosure.

Aspect 1: An air-water extraction system comprising: a water selective membrane configured to transport water from humid air via selective diffusion through the water selective membrane from a first side to a second side; a low pressure chamber in fluid communication with the second side of the water selective membrane and a hydrogen gas inlet configured to deliver a dry hydrogen to the low pressure gas chamber; a membrane and electrode assembly comprising an anode, a proton exchange membrane, a cathode, and a power supply; wherein the anode is in fluid communication with the low pressure chamber; a high pressure chamber in fluid communication with the cathode for receiving a saturated hydrogen and a liquid water from the cathode; a water conduit in fluid communication with the high pressure chamber configured to remove the liquid water from the high pressure chamber; and a hydrogen conduit for removing the saturated hydrogen from the high pressure chamber.

Aspect 2: The air-water extraction system of Aspect 1, wherein a throttling valve is located in the hydrogen conduit and the hydrogen conduit is in fluid communication with the hydrogen gas inlet.

Aspect 3: The air-water extraction system of any one or more of the preceding aspects, wherein the water selective membrane is in the form of a tube having an inner chamber; wherein the tube is configured such that the humid air passes from an outer surface of the tube through the water selective membrane to mix with the dry hydrogen in the inner chamber.

Aspect 4: The air-water extraction system of any one or more of the preceding aspects, wherein the low pressure chamber is configured to operate at a pressure of 0.2 kPa to 50 MPa. The pressure in the low pressure chamber is lower than the pressure in the high pressure chamber, for example, at least 10% lower, or at least 50% lower, or 10 to 90% lower.

Aspect 5: The air-water extraction system of any one or more of the preceding aspects, wherein the high pressure chamber is configured to maintain a pressure of 5 to 100 MPa. The pressure in the high pressure chamber is higher than the pressure in the low pressure chamber, for example, at least 10% higher, or at least 50% higher, or 10 to 90% higher.

Aspect 6: The air-water extraction system of any one or more of the preceding aspects, further comprising a water storage tank in fluid communication with the high pressure chamber.

Aspect 7: The air-water extraction system of any one or more of the preceding aspects, wherein the power supply is configured to supply a voltage of less than or equal to 1 volt, or less than or equal to 0.8 volts, less than or equal to 0.2 volts, or 0.01 to 0.2 volts to the membrane and electrode assembly.

Aspect 8: The air-water extraction system of any one or more of the preceding aspects, wherein the membrane and electrode assembly further comprises a gas diffusion layer.

Aspect 9: The air-water extraction system of any one or more of the preceding aspects, wherein the proton exchange membrane comprises a hydrocarbon polymer.

Aspect 10: The air-water extraction system of any one or more of the preceding aspects, further comprising a fan located on the first side of the water selective membrane configured to direct the humid air towards the water selective membrane.

Aspect 11: A method of removing water from humid air optionally using the system of any one or more of the preceding aspects, the method comprising: transporting water from a humid air through a water selective membrane to a low pressure chamber and directing a dry hydrogen to the low pressure chamber via a hydrogen gas inlet to form a mixed gas, wherein the low pressure chamber is in fluid communication with a membrane and electrode assembly, wherein the membrane and electrode assembly comprises an anode, a proton exchange membrane, a cathode, and an power supply; applying a voltage to the membrane and electrode assembly to cause the dry hydrogen at the anode to disassociate into protons and electrons and directing the protons and the water from the anode through the proton exchange membrane to the cathode, wherein the protons recombine with the electrons at the cathode to form a combined hydrogen; and collecting the combined hydrogen and the water in a high pressure chamber.

Aspect 12: The method of Aspect 11, further comprising removing the water in the liquid form from the high pressure chamber via a water conduit.

Aspect 13: The method of any one or more of Aspects 11 to 12, further comprising removing the combined hydrogen from the high pressure chamber via a hydrogen conduit, reducing a pressure and a relative humidity of the combined hydrogen to form the dry hydrogen, and introducing the dry hydrogen to the low pressure chamber via the hydrogen gas inlet.

Aspect 14: The method of any one or more of Aspects 11 to 13, wherein the humid air has an initial relative humidity of 20 to 100%.

Aspect 15: The method of any one or more of Aspects 11 to 14, wherein the dry hydrogen has a relative humidity of less than or equal to 20%, or 0 to 15%, or 5 to 10.

Aspect 16: The method of any one or more of Aspects 11 to 15, wherein the water transported through the water selective membrane and the dry hydrogen (including any water in the dry hydrogen) account for 90 to 100 vol %, or 95 to 100 vol %, or 99.5 to 100 vol % of the total volume of the mixed gas in the low pressure chamber.

Aspect 17: The method of any one or more of Aspects 11 to 16, wherein the water selective membrane is in the form of a tube having an inner chamber, wherein the method comprises directing the dry hydrogen through the inner chamber of the tube and introducing the humid air to the outer surface of the tube such that water from the humid air is transported through the water selective membrane to the inner chamber; wherein the inner chamber of the tube is the low pressure chamber or the inner chamber of the tube is in fluid communication with the low pressure chamber.

Aspect 18: The method of any one or more of Aspects 11 to 17, wherein the applying the voltage comprises applying less than or equal to 1 volt, or less than or equal to 0.8 volts, less than or equal to 0.5 volts, or 0.01 to 0.2 volts.

Aspect 19: The method of any one or more of Aspects 11 to 18, wherein a pressure in the low pressure chamber is 0.2 kPa to 5 MPa and a pressure in the high pressure chamber is 5 to 100 MPa.

Aspect 20: The method of any one or more of Aspects 11 to 19, further comprising directing the humid air to the first side of the water selective membrane.

Aspect 21: The assembly of any one or more of the preceding aspects, wherein at least one of the low pressure chamber and the high pressure chamber comprises an expanded sheet metal.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

When an element such as a layer, film, region, or substrate is referred to as being "in contact with" another element, it can be in direct contact with the other element or intervening elements can also be present. In contrast, when an element is referred to as being "in direct physical contact with" another element, there are no intervening elements present.

The pressure values as used herein can be absolute pressure values. The relative humidity values are at the operating temperature and pressure in the respective locations, for example, in the external environment, in a conduit, in the low pressure chamber, or in the high pressure chamber.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.).

The term "at least one of" means that the list is inclusive of each element individually, as well as combinations of two or more elements of the list, and combinations of at least one element of the list with like elements not named. Unless defined otherwise, technical and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An air-water extraction system comprising:
   a water selective membrane configured to transport water from humid air via selective diffusion through the water selective membrane from a first side to a second side;
   a low pressure chamber in fluid communication with the second side of the water selective membrane and a hydrogen gas inlet configured to deliver a dry hydrogen to the low pressure gas chamber;
   a membrane and electrode assembly comprising an anode, a proton exchange membrane, a cathode, and a power supply; wherein the anode is in fluid communication with the low pressure chamber;
   a high pressure chamber in fluid communication with the cathode for receiving a saturated hydrogen and a liquid water from the cathode;
   a water conduit in fluid communication with the high pressure chamber configured to remove the liquid water from the high pressure chamber; and
   a hydrogen conduit for removing the saturated hydrogen from the high pressure chamber.

2. The air-water extraction system of claim 1, wherein a throttling valve is located in the hydrogen conduit and the hydrogen conduit is in fluid communication with the hydrogen gas inlet.

3. The air-water extraction system of claim 1, wherein the water selective membrane is in the form of a tube having an inner chamber; wherein the tube is configured such that the humid air passes from an outer surface of the tube through the water selective membrane to mix with the dry hydrogen in the inner chamber.

4. The air-water extraction system of claim 1, wherein the low pressure chamber is configured to operate at a pressure of 0.2 kPa to 5 MPa.

5. The air-water extraction system of claim 1, wherein the high pressure chamber is configured to maintain a pressure of 5 to 100 MPa.

6. The air-water extraction system of claim 1, further comprising a water storage tank in fluid communication with the high pressure chamber.

7. The air-water extraction system of claim 1, wherein the power supply is configured to supply a voltage of less than or equal to 1 volt to the membrane and electrode assembly.

8. The air-water extraction system of claim 1, wherein the membrane and electrode assembly further comprises a gas diffusion layer.

9. The air-water extraction system of claim 1, wherein the proton exchange membrane comprises a hydrocarbon polymer.

10. The air-water extraction system of claim 1, further comprising a fan located on the first side of the water selective membrane configured to direct the humid air towards the water selective membrane.

11. A method of removing water from humid air, the method comprising:
    transporting water from a humid air through a water selective membrane to a low pressure chamber and directing a dry hydrogen to the low pressure chamber via a hydrogen gas inlet to form a mixed gas, wherein the low pressure chamber is in fluid communication with a membrane and electrode assembly, wherein the membrane and electrode assembly comprises an anode, a proton exchange membrane, a cathode, and a power supply;
    applying a voltage to the membrane and electrode assembly to cause the dry hydrogen at the anode to disassociate into protons and electrons and directing the protons and the water from the anode through the proton exchange membrane to the cathode, wherein the protons recombine with the electrons at the cathode to form a combined hydrogen; and
    collecting the combined hydrogen and the water in in a high pressure chamber.

12. The method of claim 11, further comprising removing the water in the liquid form from the high pressure chamber via a water conduit.

13. The method of claim 11, further comprising removing the combined hydrogen from the high pressure chamber via a hydrogen conduit, reducing a pressure and a relative humidity of the combined hydrogen to form the dry hydrogen, and introducing the dry hydrogen to the low pressure chamber via the hydrogen gas inlet.

14. The method of claim 11, wherein the humid air has an initial relative humidity of 20 to 100%.

15. The method of claim 11, wherein the dry hydrogen has a relative humidity of less than or equal to 20%.

16. The method of claim 11, wherein the water transported through the water selective membrane and the dry hydrogen account for 90 to 100 vol % of the total volume of the mixed gas in the low pressure chamber.

17. The method of claim 11, wherein the water selective membrane is in the form of a tube having an inner chamber, wherein the method comprises directing the dry hydrogen through the inner chamber of the tube and introducing the humid air to the outer surface of the tube such that water from the humid air is transported through the water selective membrane to the inner chamber; wherein the inner chamber of the tube is the low pressure chamber or the inner chamber of the tube is in fluid communication with the low pressure chamber.

18. The method of claim 11, wherein the applying the voltage comprises applying less than or equal to 1 volt.

19. The method of claim 11, wherein a pressure in the low pressure chamber is 0.2 kPa to 5 MPa and a pressure in the high pressure chamber is 5 to 100 MPa.

20. The method of claim 11, further comprising directing the humid air to the first side of the water selective membrane.

* * * * *